United States Patent
Bergström et al.

(10) Patent No.: US 10,716,143 B2
(45) Date of Patent: *Jul. 14, 2020

(54) METHOD AND DEVICE FOR TIMING CORRECTION IN A CHANNEL ACCESS USING A LISTEN-BEFORE-TALK PROTOCOL

(71) Applicant: Telefonaktiebolaget LM Ericsson (publ), Stockholm (SE)

(72) Inventors: Mattias Bergström, Stockholm (SE); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/088,295

(22) PCT Filed: Feb. 8, 2017

(86) PCT No.: PCT/SE2017/050121
§ 371 (c)(1),
(2) Date: Sep. 25, 2018

(87) PCT Pub. No.: WO2017/171604
PCT Pub. Date: Oct. 5, 2017

(65) Prior Publication Data
US 2019/0082462 A1  Mar. 14, 2019

Related U.S. Application Data

(60) Provisional application No. 62/316,177, filed on Mar. 31, 2016.

(51) Int. Cl.
*H04W 74/08* (2009.01)
*H04W 56/00* (2009.01)
(Continued)

(52) U.S. Cl.
CPC ....... *H04W 74/0808* (2013.01); *H04L 5/0048* (2013.01); *H04W 48/16* (2013.01);
(Continued)

(58) Field of Classification Search
CPC ................................................ H04W 74/0808
See application file for complete search history.

(56) References Cited

U.S. PATENT DOCUMENTS

2014/0086219 A1* 3/2014 Suzuki ............. H04W 56/0005
370/336
2014/0112289 A1  4/2014 Kim et al.
(Continued)

FOREIGN PATENT DOCUMENTS

EP  2508019 A1  10/2012
WO  2016018182 A1  2/2016

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.
(Continued)

*Primary Examiner* — John D Blanton
(74) *Attorney, Agent, or Firm* — Sage Patent Group

(57) ABSTRACT

According to some embodiments, a wireless device maintains timing associated with uplink transmissions by performing steps for each of a plurality of scheduled LBT transmission opportunities. The steps include determining whether an error in a current uplink transmission timing, with respect to a reference point based on a downlink timing for a reference cell, exceeds a predetermined threshold and adjusting the timing associated with uplink transmissions, for each scheduled LBT transmission opportunity for which the error exceeds the predetermined threshold. The steps
(Continued)

also include performing an LBT assessment to determine whether the wireless device is permitted to transmit in the scheduled LBT transmission opportunity and, for each scheduled LBT transmission opportunity in which the LBT assessment indicates that the wireless device is not permitted to transmit, reversing any adjustment to the timing associated with uplink transmissions made for that scheduled LBT transmission opportunity.

9 Claims, 10 Drawing Sheets

(51) Int. Cl.
*H04W 76/28* (2018.01)
*H04L 5/00* (2006.01)
*H04W 48/16* (2009.01)

(52) U.S. Cl.
CPC ....... *H04W 56/00* (2013.01); *H04W 56/0065* (2013.01); *H04W 74/0891* (2013.01); *H04W 76/28* (2018.02)

(56) References Cited

U.S. PATENT DOCUMENTS

2015/0382374 A1   12/2015  Bhorkar et al.
2017/0222749 A1*   8/2017  Dinan ................... H04L 1/0023
2018/0359772 A1*  12/2018  Park ...................... H04W 16/14

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 13)", 3GPP TS 36.133 V13.2.0, Jan. 2016, 1-1517.

* cited by examiner

METHOD AND DEVICE FOR TIMING CORRECTION IN A CHANNEL ACCESS USING A LISTEN-BEFORE-TALK PROTOCOL

TECHNICAL FIELD

The present invention generally relates to wireless communication networks, and particularly relates to transmission timing when using unlicensed frequency bands.

BACKGROUND

Long Term Evolution (LTE) specifications support Component Carrier (CC) bandwidths up to 20 MHz (the maximum LTE Rel-8 carrier bandwidth). LTE operation with wider bandwidth than 20 MHz is possible, using multiple CCs, appearing as a number of LTE carriers to an LTE terminal. A straightforward way to obtain this would be by means of Carrier Aggregation (CA). The LTE standard supports up to five aggregated carriers, where each carrier is limited, according to the 3GPP specifications, to have one of six bandwidths, namely 6, 15, 25, 50, 75 or 100 RB (corresponding to 1.4, 3, 5, 10, 15 and 20 MHz respectively). The number of aggregated CCs as well as the bandwidth of the individual CC may be different for uplink and downlink.

During initial access, an LTE CA-capable terminal behaves similarly to a terminal not capable of CA. Upon successful connection to the network, a terminal may, depending on its own capabilities and the network, be configured with additional CCs in the uplink (UL) and downlink (DL). This configuration is based on Resource Radio Control (RRC) signaling. Due to the heavy signaling and rather slow speed of RRC signaling, it is envisioned that a terminal may be configured with multiple CCs, even when not all of them are currently used.

In CA, the terminal (user equipment or UE) is configured with a primary CC (PCC), a primary cell (PCell) or a primary serving cell (PSC). The PCell is particularly important, e.g., due to control signaling on this cell and UE monitoring of the radio quality on the PCell. A CA-capable terminal can, as explained above, also be configured with additional carriers (or cells or serving cells) which are referred to as secondary CCs (SCC), secondary cells (SCell) or secondary serving cells (SSC). Note that these terms may be used interchangeably.

To further improve the performance of LTE systems, CA has been expanded to enable the use of LTE in an unlicensed spectrum. This operation is referred to as Licensed Assisted Access (LAA). Since unlicensed spectrum may never match the qualities of licensed spectrum, the intention with LAA is to apply carrier aggregation and use a secondary carrier in an unlicensed band, while having a primary carrier in a licensed band. This will then ensure that the reliability associated with licensed carriers can be enjoyed for the primary carrier and only secondary carriers are used in unlicensed bands. However, operation of unlicensed carrier as standalone operation or CA with a primary carrier in an unlicensed band may also be employed. CA using licensed and unlicensed carriers is shown, for example, in FIG. 1.

According to 3GPP specifications under development, frame structure type 3 (FS3) is applicable to LAA secondary cell operation. In FS3, a radio frame is 10 milliseconds (ms) long and consists of 10 frames, each of 1 ms. Each subframe has two slots, each with a length of 0.5 ms. In Release 13 of the 3GPP specifications, all 10 subframes within a radio frame are for downlink transmissions. With LAA operation in uplink, the frame structure may introduce new configurations containing a mixture of downlink and uplink subframes in a radio frame.

In Dual Connectivity (DC) operation, the UE can be served by at least two nodes called master eNB (MeNB) and secondary eNB (SeNB). More generally, in multiple connectivity (multi-connectivity or MC) operation, the UE can be served by two or more nodes, such as an MeNB, SeNB1, SeNB2 and so on. The UE is configured with a primary component carrier (PCC) from both MeNB and SeNB. The primary cell (PCell) from MeNB and SeNB are called PCell and primary secondary cell (PSCell), respectively. The PCell and PSCell typically operate the UE independently. The UE is also configured with one or more secondary component carriers (SCCs) from each of MeNB and SeNB. The corresponding secondary serving cells served by MeNB and SeNB are called secondary cells (SCells). The UE in DC typically has separate transmission/reception for each of the connections with MeNB and SeNB. This allows the MeNB and SeNB to independently configure each UE with one or more procedures, such as radio link monitoring (RLM), DRX cycle, etc., on its PCell and PSCell, respectively.

In order to transmit in unlicensed spectrum, which is free and shared by everyone, some regulations have to be followed. Most regulatory bodies, including Europe's ETSI, require networks operating in unlicensed spectrum to use a Carrier Sense Multiple Access (CSMA) protocol. This means that transmitters are required to listen to the presence of carriers in the channel (or a time resource such as a symbol, time slot, frame, subframe, etc.) before occupying the channel and transmitting for a particular duration. This is performed by detecting energy on that particular channel for a channel sensing duration. Hence, this protocol is also known as Listen-Before-Talk (LBT) protocol.

Due to LBT, a transmission in an unlicensed band may be delayed until the medium becomes free again. In a case where there is no coordination between the transmitting nodes (which often is the case), the delay may appear random. More specifically, the transmitter node determines whether the channel is free or occupied by measuring the energy on the medium over a certain duration, i.e., an LBT measurement duration. If the channel is found to be free, the transmitter occupies the channel and can transmit during a channel occupancy time, which can extend over a certain number of time resources, such as between 4 ms and 10 ms. If the channel is found to be occupied, on the other hand, the transmitter node refrains from transmitting and waits until the channel becomes free.

To determine whether the channel is occupied or not during a particular LBT duration, a transmitter measures the energy detected during the LBT measurement duration and computes the corresponding power level. The power level is compared against a carrier sensing threshold, which may be referred to as an LBT threshold. If the power level is above the carrier sensing threshold, the channel is considered to be occupied. On the other hand, if the power level is below the threshold, then the channel is considered to be free.

The LBT procedure may also be called a channel-carrier-sense multiple-access (CSMA) scheme, a channel assessment scheme, a clear-channel assessment scheme, etc. The CSMA or LBT based operation is more generally referred to as contention-based operation. This contention-based operation is typically used for transmission on carriers of an unlicensed band. However, this mechanism may also be applied for operating on carriers belonging to licensed bands, for example, to reduce interference.

According to 3GPP TS 36.133 v13.2.0, the UE is required to update or adjust the uplink transmission timing based on some rules. The intent is to ensure that the uplink transmission timing does not drift in time, as that would result in difficulties in decoding the transmission at the eNB, or interference may even arise. The details of the uplink transmission timing adjustments are defined as follows (from 3GPP TS 36.133 v13.2.0):

7.1 UE Transmit Timing 7.1.1 Introduction

The UE shall have capability to follow the frame timing change of the connected eNodeB. The uplink frame transmission takes place $(N_{TA}+N_{TA\_offset}) \times T_s$ before the reception of the first detected path (in time) of the corresponding downlink frame from the reference cell. The UE shall be configured with a pTAG containing the PCell. The pTAG may also contain up to four SCells, if configured. The UE capable of supporting multiple timing advances may also be configured with one or two serving cells with uplink in one or two sTAG and pTAG.

The other downlink SCell(s), if configured, will be contained in either the pTAG or the sTAG(s). In pTAG, the UE shall use the PCell as the reference cell for deriving the UE transmit timing for cells in the pTAG. When the UE capable of supporting multiple timing advance is configured with one or two sTAG(s), the UE shall use an activated SCell from the sTAG for deriving the UE transmit timing for cells in the sTAG. UE initial transmit timing accuracy, maximum amount of timing change in one adjustment, minimum and maximum adjustment rate are defined in the following requirements. The requirements in clause 7 apply to all TAGs.

The UE capable of supporting dual connectivity shall be configured with one pTAG and may also be configured with one psTAG. The pTAG shall contain the PCell and may also contain one SCell, if configured. The psTAG shall contain the PSCell and may also contain one SCell, if configured. In pTAG, the UE shall use the PCell as the reference cell for deriving the UE transmit timing for pTAG, and in psTAG, the UE shall use the PSCell as the reference cell for deriving the UE transmit timing for psTAG. UE initial transmit timing accuracy, maximum amount of timing change in one adjustment, minimum and maximum adjustment rate are defined in the following requirements. The requirements in clause 7 apply to both TAGs.

7.1.2 Requirements

The UE initial transmission timing error shall be less than or equal to $\pm T_e$ where the timing error limit value $T_e$ is specified in Table 7.1.2-1. This requirement applies when it is the first transmission in a DRX cycle for PUCCH, PUSCH and SRS or it is the PRACH transmission. The reference point for the UE initial transmit timing control requirement shall be the downlink timing of the reference cell minus $(N_{TA\_ref}+N_{TA\_offset}) \times T_s$. The downlink timing is defined as the time when the first detected path (in time) of the corresponding downlink frame is received from the reference cell. $N_{TA\_Ref}$ for PRACH is defined as 0. $(N_{TA\_Ref}+N_{TA\_offset})$ (in $T_s$ units) for other channels is the difference between UE transmission timing and the downlink timing immediately after when the last timing advance in clause 7.3 was applied. $N_{TA\_Ref}$ for other channels is not changed until next timing advance is received.

TABLE 7.1.2-1

$T_e$ Timing Error Limit

| Downlink Bandwidth (MHz) | $T_e$ |
|---|---|
| 1.4 | 24 * $T_S$ |
| ≥3 | 12 * $T_S$ |

Note:
$T_S$ is the basic timing unit defined in TS 36.211

When it is not the first transmission in a DRX cycle or there is no DRX cycle, and when it is the transmission for PUCCH, PUCCH and SRS transmission, the UE shall be capable of changing the transmission timing according to the received downlink frame of the reference cell except when the timing advance in clause 7.3 is applied. The UE is required to adjust its timing to within $\pm T_e$ in a TAG when, changing the downlink SCell for deriving the UE transmit timing for cells in the sTAG configured with one or two uplinks, in this TAG the transmission timing error between the UE and the reference timing exceeds ±Te, configured with a pTAG and one or two sTAG, the transmission timing difference between TAGs does not exceed the maximum transmission timing difference (i.e., 32.47 us) after such adjustment.

If the transmission timing difference after such adjustment is bigger than the maximum transmission timing difference (i.e., 32.47 us), the UE may stop adjustment in this TAG. The reference timing shall be $(N_{TA\_Ref}+N_{TA\_offset}) \times T_s$ before the downlink timing of the reference cell. All adjustments made to the UE uplink timing under the above mentioned scenarios shall follow these rules:

1) The maximum amount of the magnitude of the timing change in one adjustment shall be Tq seconds.
2) The minimum aggregate adjustment rate shall be 7*TS per second.
3) The maximum aggregate adjustment rate shall be Tq per 200 ms.

where the maximum autonomous time adjustment step Tq is specified in Table 7.1.2-2.

TABLE 7.1.2-2

$T_q$ Maximum Autonomous Time Adjustment Step

| Downlink Bandwidth (MHz) | $T_q$ |
|---|---|
| 1.4 | 17.5 * $T_S$ |
| 3 | 9.5 * $T_S$ |
| 5 | 5.5 * $T_S$ |
| ≥10 | 3.5 * $T_S$ |

Note:
$T_S$ is the basic timing unit defined in TS 36.211

SUMMARY

With the introduction of LAA, the UE may be required to perform LBT before performing uplink transmissions, and hence the uplink transmission timing adjustment requirements defined in 3GPP TS 36.133 v13.2.0 would no longer be suitable. In particular, the UE behavior regarding UE transmit timing adjustment is undefined and unknown in a scenario when the UE is configured or scheduled to transmit uplink signals but it cannot transmit, for example, due to channel inaccessibility or LBT failure. The UE behavior in terms of transmit timing adjustment is also unclear if there is LBT failure in both uplink and downlink on a carrier while the UE is scheduled or configured to transmit in the uplink.

To address these problems, various embodiments described herein are directed to how a UE performs uplink transmission timing adjustments in scenarios where the UE operates on at least one carrier for which UE transmissions may be dropped from time to time, such as due to LBT procedure outcomes.

According to some embodiments, a method, in a wireless device, for maintaining timing associated with uplink transmissions includes, for each of a plurality of scheduled LBT transmission opportunities: determining whether an error in a current uplink transmission timing, with respect to a reference point based on a downlink timing for a reference cell, exceeds a predetermined threshold and adjusting the timing associated with uplink transmissions, for each scheduled LBT transmission opportunity for which the error exceeds the predetermined threshold. The method also includes performing an LBT assessment for each of the plurality of scheduled LBT transmission opportunities, to determine whether the wireless device is permitted to transmit in the scheduled LBT transmission opportunity, and, for each scheduled LBT transmission opportunity in which the LBT assessment indicates that the wireless device is not permitted to transmit, reversing any adjustment to the timing associated with uplink transmissions made for that scheduled LBT transmission opportunity.

According to some embodiments, a method, in a wireless device, for maintaining timing associated with uplink transmissions includes, for each of a plurality of scheduled LBT transmission opportunities: determining whether an error in a current uplink transmission timing, with respect to a reference point based on a downlink timing for a reference cell, exceeds a predetermined threshold and, for each scheduled LBT transmission opportunity for which the error exceeds the predetermined threshold, selectively adjusting the timing associated with uplink transmissions, based on an estimated likelihood of LBT success. The method also includes performing an LBT assessment for each of the plurality of scheduled LBT transmission opportunities, to determine whether the wireless device is permitted to transmit in the scheduled LBT transmission opportunity. The method may also include, for each scheduled LBT transmission opportunity in which the LBT assessment indicates that the wireless device is not permitted to transmit, reversing any adjustment to the timing associated with uplink transmissions made for that scheduled LBT transmission opportunity.

The method may also be implemented by apparatus, devices, computer readable medium, computer program products and functional implementations. For instance, an example wireless device according to some embodiments is adapted to carry out one or more of the methods summarized above, or variants thereof. Thus, some embodiments of a wireless devices are adapted to, for each of a plurality of scheduled LBT transmission opportunities: determine whether an error in a current uplink transmission timing, with respect to a reference point based on a downlink timing for a reference cell, exceeds a predetermined threshold; adjust timing associated with uplink transmissions, for each scheduled LBT transmission opportunity for which the error exceeds the predetermined threshold; perform an LBT assessment to determine whether the wireless device is permitted to transmit in the scheduled LBT transmission opportunity; and, for each scheduled LBT transmission opportunity in which the LBT assessment indicates that the wireless device is not permitted to transmit, reverse any adjustment to the timing associated with uplink transmissions made for that scheduled LBT transmission opportunity.

Other embodiments of a wireless device are adapted to, for each of a plurality of scheduled uplink transmission opportunities: determine whether an error in a current uplink transmission timing, with respect to a reference point based on a downlink timing for a reference cell, exceeds a predetermined threshold; and, for each scheduled LBT transmission opportunity for which the error exceeds the predetermined threshold, selectively adjust the timing associated with uplink transmissions, based on an estimated likelihood of LBT success.

In some embodiments of a wireless device configured to maintain timing associated with uplink transmissions, any one or more of the techniques summarized above are carried with a processing circuit configured to perform the operations described above, e.g., using program code organized into functional modules corresponding to some or all of the operations summarized above.

The described methods may be implemented in a UE by means of feedback signaling from an LBT entity implemented in the UE to an uplink transmission timing adjustment entity also implemented in the UE.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
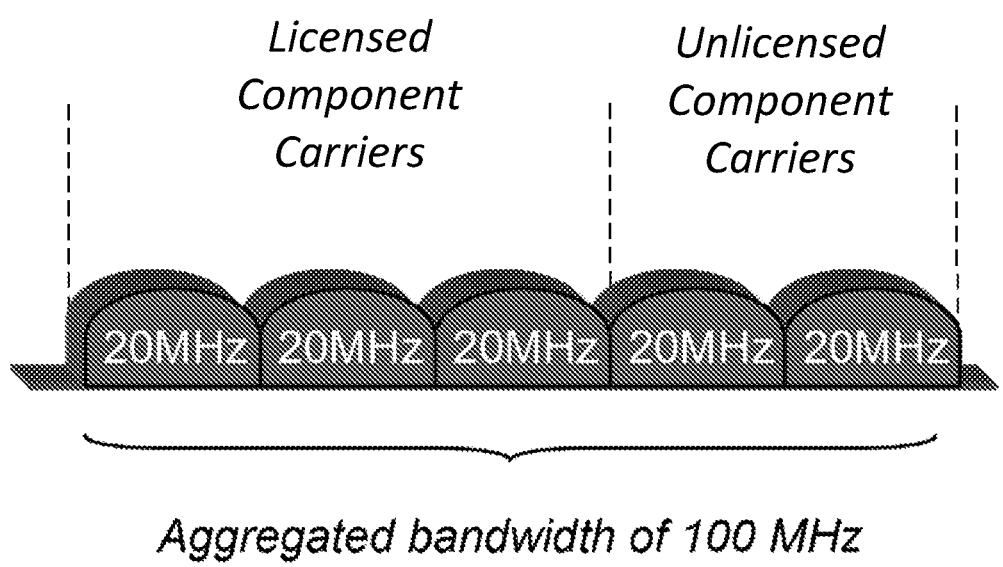
FIG. 1 is a diagram illustrating carrier aggregation with licensed and unlicensed frequency bands.

Various embodiments described herein relate to when a UE is configured with at least one serving cell in which a channel access mechanism (e.g. LBT) is applied in order to decide whether the signals can be transmitted or not. The LBT can be applied in downlink by the network node and/or in uplink by the UE. Various embodiments also relate to when a UE is configured with a plurality of serving cells, such as in carrier aggregation (CA), multi-connectivity (MC), etc. For example, a UE can be served by a PCell and one or more SCells; a PCell and a PSCell; or a PCell, PSCell and one or more SCells. The embodiments described herein are applicable to CA, DC and MC.

When a UE is operating on at least one serving cell belonging to a carrier requiring a contention-based operation, the UE, before transmitting on uplink, is required to check whether the channel is free or not. The contention-based transmission is typically required in unlicensed bands but it can also be used in licensed bands. For example, the UE is required to perform an LBT procedure before deciding to transmit in uplink. During this procedure, the UE will sense the channel to determine whether some other entity is transmitting on the channel. This may be determined based on an energy-level of the channel being below a threshold. For example, if the energy-level is below a threshold, the UE would consider the channel to be free (empty or clear). While if the energy-level is above a threshold, the UE would consider the channel to be occupied/busy. If the channel is considered to be busy, the UE would not be able or allowed to transmit. But if the channel is considered free, the UE would be allowed to perform the transmission.

If existing solutions are applied, then the UE may adjust its uplink timing for the transmission each time such a transmission is scheduled. For example, according to existing solutions, the UE may might adjust a timing when an uplink transmission is scheduled, even when it turns out that the UE cannot transmit due to UE LBT failure. It should be appreciated that the present 3GPP specifications for uplink timing adjustments put limits on how large an adjustment may be made at any given transmission opportunity. If uplink transmit timing adjustments are made at each LBT transmission opportunity, without regards to whether a transmission is made, the result may be that several adjustments of the maximum size may be made in a row, without any of those adjustments actually being "seen" by the eNB at the other end of the link. When a transmission ultimately occurs, the eNB may then see a change in uplink timing that is much larger than expected which may result in the eNB failing to receive and decode the transmission.

The embodiments described herein, then, are directed to how a UE performs autonomous uplink transmission timing updates when operating on carriers in unlicensed spectrum.

Some embodiments described herein assume LBT operation is applied by the UE on an uplink serving cell. Also, these embodiments are described for operation on carriers of an unlicensed band (e.g., LAA carriers). However, all of these embodiments are applicable to any kind of channel access or CSMA mechanism performed on licensed carriers or unlicensed carriers.

Figure 2:
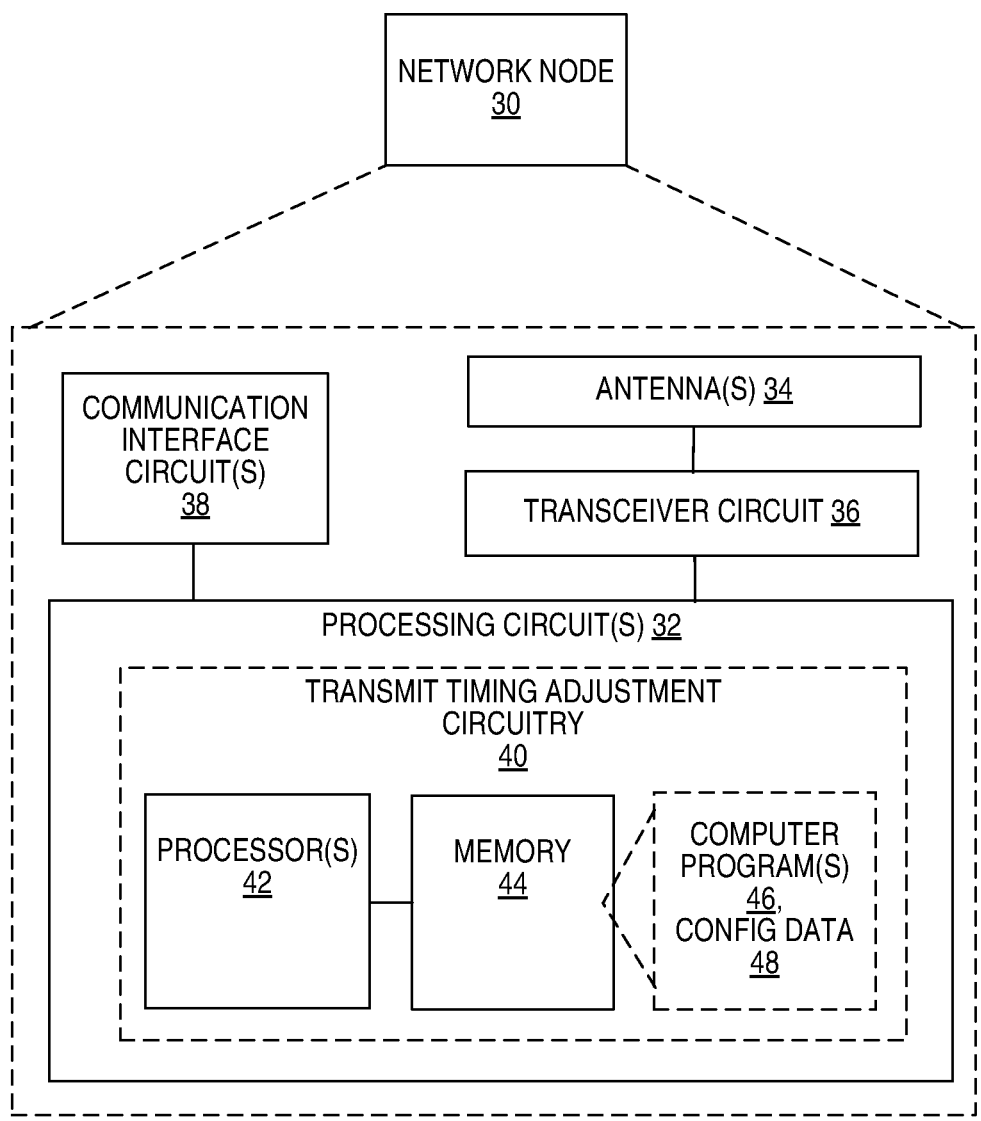
FIG. 2 is a block diagram of a network node configured to determine whether a wireless device has adjusted its transmit timing, according to some embodiments.

FIG. 2 illustrates a network node 30. The network node 30 facilitates communication between UEs and the core network. The generic terminology "network node" is used, but the network node 30 can be any kind of network node such as a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. It may also include, in some cases, Operations Support System (OSS), Operations and Maintenance (O&M), Self-Organizing Network (SON), positioning node, Evolved Serving Mobile Location Center (E-SMLC), a centralized controller, a core network node, Mobility Management Entity (MME), base station controller, or network controller.

The network node 30 includes a communication interface circuit 38 that includes circuitry for communicating with other nodes in the core network, radio nodes, and/or other types of nodes in the network for the purposes of providing data and cellular communication services. The network node 30 communicates with UEs via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, general packet radio service (GPRS), wideband code division multiple access (WCDMA), high-speed downlink packet access (HSDPA), LTE and LTE-Advanced.

The network node 30 also includes one or more processing circuits 32 that are operatively associated with the communication interface circuit 38 or transceiver circuit 36. The network node 30 uses the communication interface circuit 38 to communicate with network nodes and the transceiver 36 to communicate with UEs. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

Figure 3:
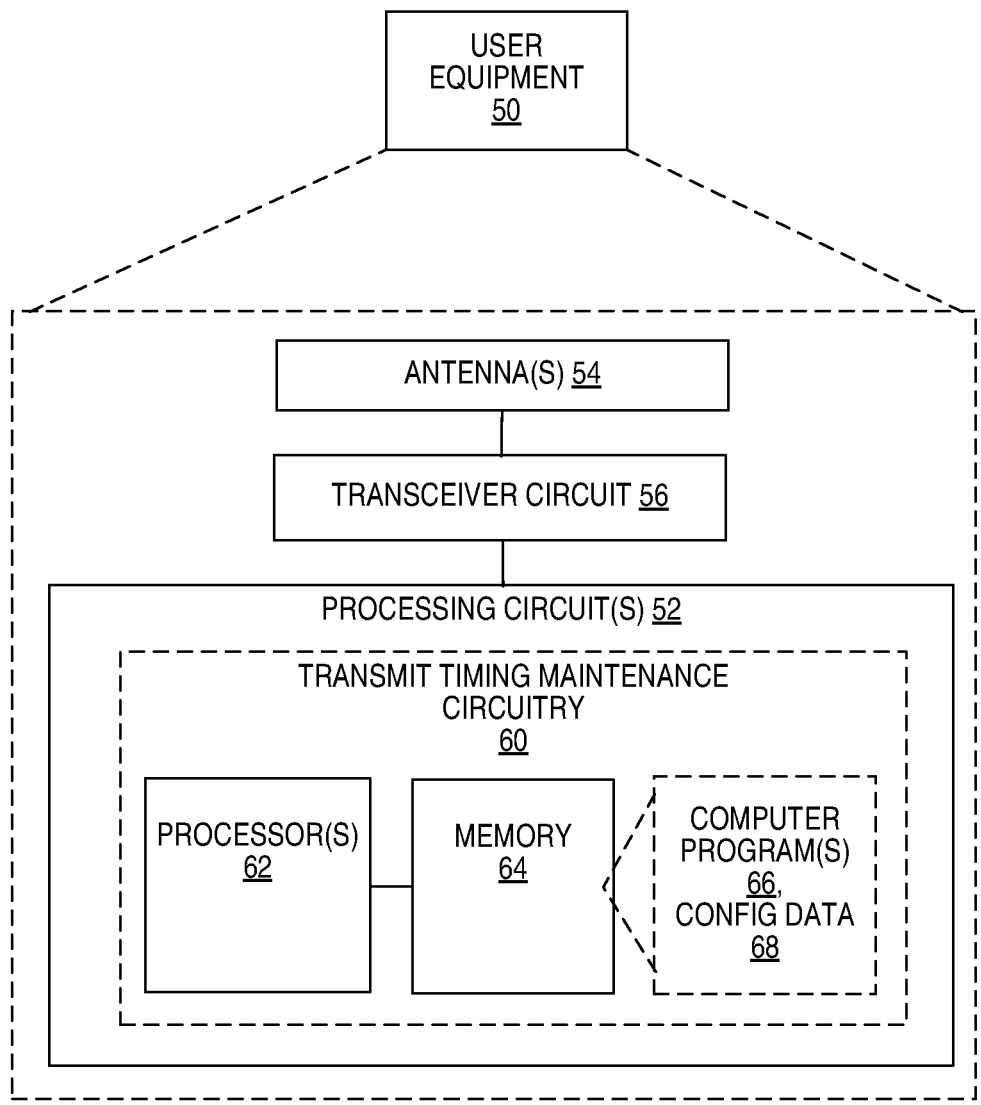
FIG. 3 is a block diagram of a user equipment configured to maintain timing associated with uplink transmissions, according to some embodiments.

FIG. 3 illustrates a diagram of a wireless device, such as a user equipment 50, according to some embodiments. To ease explanation, the user equipment 50 may also be considered to represent any wireless device that may utilize CA or LAA in a network. The UE may be a radio communication device, target device (device targeted for communication), device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

The user equipment 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The user equipment 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

In some embodiments, the processor 62 of the processing circuit 52 may execute a computer program 66 stored in the memory 64 that also configures the processor 62 to perform steps for each of a plurality of scheduled uplink transmission opportunities. These steps include evaluating a condition regarding a number of downlink receptions within an evaluation period preceding the scheduled uplink transmission opportunity and selectively adjusting or not adjusting the timing, for each scheduled uplink transmission opportunity, based on the evaluating.

In some embodiments, the processor 62 of the processing circuit 52 may execute a computer program 66 stored in the memory 64 that configures the processor 62 to perform steps for each of a plurality of scheduled uplink transmission opportunities at which the timing is adjusted. These steps include determining an accuracy of an estimated downlink timing and scaling or adapting an adjustment to the timing based on the determined accuracy.

Figure 4:
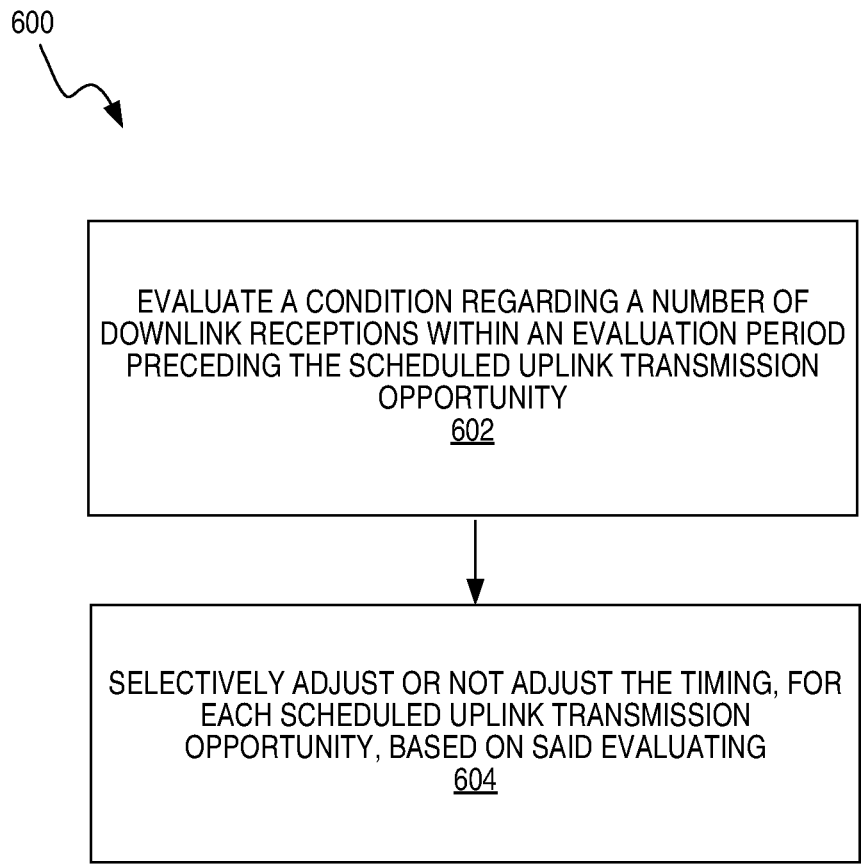
FIG. 4 illustrates a method of maintaining timing associated with uplink transmissions, according to some embodiments.

FIG. 4 illustrates a method 600 for maintaining timing associated with uplink transmissions that may be performed by a wireless device such as UE 50, according to some embodiments. The method 600 includes, for each of a plurality of scheduled uplink transmission opportunities: evaluating a condition regarding a number of downlink receptions within an evaluation period preceding the scheduled uplink transmission opportunity (block 602) and selectively adjusting or not adjusting the timing, for each scheduled uplink transmission opportunity, based on the evaluating (block 604).

Evaluating the condition may include determining whether at least a predetermined number N of downlink receptions on a given carrier or carriers have been received within an evaluation period of a predetermined duration T, and wherein selectively adjusting or not adjusting the timing comprises adjusting the timing in response to the condition being met and refraining from adjusting the timing in response to the condition not being met. T may be expressed in terms of a number of symbols, or a number of time slots, or a number of subframes containing discovery reference signals.

In some cases, N or T, or both, depend on channel conditions or channel characteristics. In some cases, N or T, or both, depend one or more of: a channel bandwidth; a multipath delay profile; an estimated speed of the wireless device; an estimated Doppler shift of received signals for the wireless device; and a received signal quality. In other cases, N or T, or both, are based on configuration information received in a downlink transmission.

Evaluating the condition may also include determining whether at least a predetermined number N of downlink receptions of a given type or types, on a given carrier or carriers, have been received within the evaluation period. The given type or types may include a discovery reference signal; a cell-specific reference signal; a primary synchronization signal; and a secondary synchronization signal.

The method 600 may further include, for each of one or more scheduled uplink transmission opportunities at which the timing is adjusted: determining an accuracy of an estimated downlink timing, and scaling or adapting an adjustment to the timing based on the determined accuracy. Determining the accuracy of the estimated timing may be based on a number of downlink transmissions received in a predetermined evaluation interval preceding the adjustment. The scaling or adapting may be based on an estimated quality of a downlink channel.

When considering the advantages of the techniques illustrated in FIG. 4, it will be appreciated that uplink transmission timing in a UE is calculated using the downlink reception timing the UE perceives as reference. A benefit of the method shown in FIG. 4 is that the UE ensures that the uplink transmission is only adjusted in case the UE has received a certain number of downlink receptions during an evaluation period, which indirectly indicates that the accuracy of the downlink timing is accurate. If the UE were to adjust the uplink timing based on an inaccurate downlink timing, the adjustment may be erroneous and hence could result in that the uplink transmissions are received outside the eNB's reception window.

Figure 5:
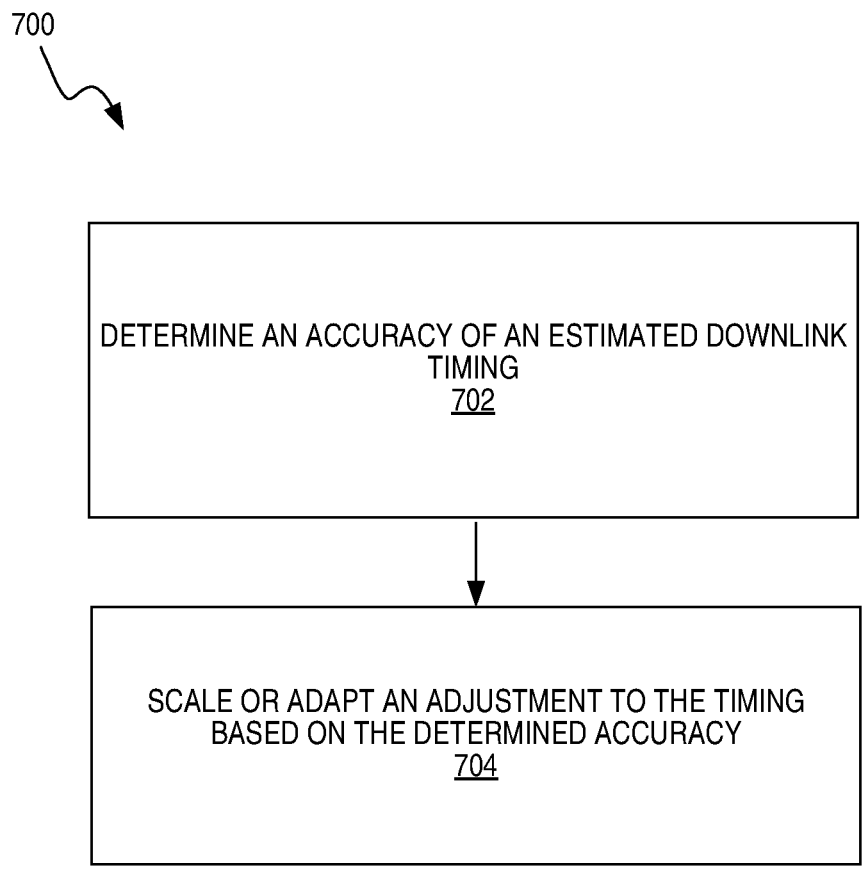
FIG. 5 illustrates another method of maintaining timing associated with uplink transmissions, according to some embodiments.

FIG. 5 illustrates another method 700 for maintaining timing associated with uplink transmissions that may be performed by a wireless device such as UE 50, according to some embodiments. The method 700 includes, for each of a plurality of scheduled uplink transmission opportunities at which the timing is adjusted: determining an accuracy of an estimated downlink timing (block 702) and scaling or adapting an adjustment to the timing based on the determined accuracy (block 704). Determining the accuracy of the estimated timing may be based on a number of downlink transmissions received in a predetermined evaluation interval preceding the adjustment. The scaling or adapting may be based on an estimated quality of a downlink channel.

When considering the advantages of the technique illustrated in FIG. 5, it will again be appreciated that the uplink transmission timing in a UE is calculated using the downlink reception timing the UE perceives as reference. Scaling or adapting an adjustment of the timing depending on the accuracy of the estimated downlink timing allows the UE to perform a smaller adjustment when the UE considers the estimated timing to not be completely accurate. This way the risks for erronous timing adjustments by the UE and for the uplink transmission to reach the eNB outside the eNBs reception window are reduced. Also, when the UE performs smaller timing adjustments, there is a higher likelihood that the eNB, by sending a timing advance command to the UE, will be able to correct any erronous timing adjustments by the UE.

It should be noted that the UE would only need to autonomously update the uplink transmission timing with a certain periodicity if the error between the expected uplink transmission timing and the actual transmission timing is large enough. A description of when the UE has to perform uplink transmission timing updates is defined in 3GPP TS 36.133 v13.2.0 section 7.1. This means that the UE will not always update the timing when one or more of the conditions described below are not met. These embodiments may also be combined with other embodiments discussed herein.

Furthermore, the UE behavior may be also adapted to increase the probability that the conditions are met. For example, the downlink reference may be adaptively selected so that the obtained downlink timing estimate is more accurate and at least a certain minimum number of downlink transmissions are available.

Further, the network node (e.g., eNB) may also adapt scheduling a UE's uplink transmissions based on the conditions, such as selectively scheduling on a carrier frequency that minimizes the uplink timing issue.

Some embodiments may involve conditioning a timing update on a number of downlink transmissions. In LAA, the network node may also need to perform an LBT procedure on LAA carriers before downlink transmissions on those carriers. This means that the network node may need to suppress transmissions in case it determines that the channel is busy. Hence, the UE may not receive downlink transmissions in a timely manner in a time resource (e.g., slot, symbol, subframe, etc.), since the network node may have suppressed, delayed or avoided the downlink transmissions.

While, in this instance, the suppression of transmissions by the network node due to LBT is used as an example, it should be appreciated that there may be other scenarios in which the network node does not perform any transmission during certain time resources. For example, in case of a lean carrier where no or reduced number of reference signals are transmitted, the network node may refrain from performing certain transmissions which are used by the UE to, among other operations, track timing.

In some scenarios, the UE may only update the uplink transmission timing if the UE has received a certain number of downlink receptions during a certain time window T. T is also interchangeably called a time period, time duration, evaluation period, etc. For example, the UE may only update the uplink transmission timing if the UE has received at least N number of downlink transmissions during a time window T. Based on this rule, when the UE updates its uplink transmit timing, the UE will evaluate whether it has received at least N number of downlink transmissions within the last time window T. If that is true, then the UE will perform the uplink transmission timing adjustment. Otherwise, it will not perform any adjustment.

The parameters N and T can be expressed in terms of one or more time resources. Examples of time resources are symbols, time slots, transmission time intervals (TTI), interleaving times, subframes, partial or half subframes, radio frames, etc. The parameter N may also be expressed in terms of a number of downlink transmissions comprising a certain type of signal, such as discovery reference signals (DRS), CRS signals, PSS/SSS signals, broadcast signals, reference signals, etc. As an example, N may be expressed in terms of number of symbols, time slots or subframes containing DRS signals.

Example values of N and T are 1 subframe and 40 subframes, respectively. Another example of values for N and T are 2 subframes and 80 subframes.

In one example, N and/or T may be pre-defined or determined based on a rule. In another example, the network node (e.g., eNB) may configure the UE with the values N and/or T. In a further example, the pre-defined rule can be based on channel conditions or characteristics. In yet another example, the network node may base or determine the configuration of these parameter values on one or more channel conditions or channel characteristics. Examples of channel conditions or channel characteristics are: channel bandwidth (e.g. downlink cell BW, uplink cell, uplink transmission BW, etc.); radio channel characteristics (e.g. Doppler speed of UE, multipath delay profile, channel coherence BW, etc.); and signal quality. Examples of signal quality are SINR, SNR, RSRP, RSSI, RSRQ, pathloss, RS-SINR, BLER, etc.

For example, if downlink channel BW is below a threshold (e.g., below 3 MHz), then the values of N and/or T are required to be above certain respective thresholds. Otherwise, the values of N and/or T can be equal to their respective thresholds.

In another example, under poor radio conditions the values of N and/or T are required to be above certain respective thresholds. Examples of poor radio conditions are when Doppler speed is above a threshold (e.g., above 70 Hz), multipath delay profile is above a threshold (e.g., above 1 μs), etc.

In yet another example, if the SINR if below a certain value the UE may use one set of N and/or T, while if the SINR is above a certain threshold the UE may use another set of N and/or T.

The values of parameters N and/or T may also depend on the UE's activity state or activity level. The UE activity may be determined based on whether the UE is in DRX, in non-DRX, or whether the DRX cycle length is below a certain threshold or not.

The UE may also scale the amount of the uplink transmission timing adjustment based on the number of received downlink transmissions.

The UE may apply one or any combination of the conditions when determining whether to update the uplink transmission timing. For example, the UE may update the uplink transmission timing if at least N' number of downlink samples or signals or transmissions have been received during a time T', where these samples or received signals are above a certain channel quality threshold, or when N available samples are above a threshold. This allows the UE to update the uplink transmission timing only if the UE has acquired a certain number of samples which have a certain quality.

In a further embodiment, whether the UE is to apply one or more conditions, and also which one or more of the plurality of conditions to be applied for uplink timing adjustment, may be configured by the network node. This may be indicated by the eNB via RRC signaling. This configuration may be applicable on a per-carrier basis or on a per-Timing Advance Group basis, or for any group of carriers. The configuration information may be signaled to the UE by means of a flag or an indicator per carrier or per TAG or per group of carriers. For example, the conditions can be pre-defined and the signaled indicator(s) represents the identifier of the condition to be used by the UE. This allows the network node to configure the UE to apply this behavior on certain carriers and/or in certain scenarios. For example, it may not be valuable to apply these conditions for carriers which do not require LBT. Even if LBT is applied to a certain carrier but the load (e.g., number of nodes using carrier, interference, etc.) on the carrier is below a threshold, then the LBT may often succeed on that carrier. For instance, a channel will be considered free such that the eNB/UE can transmit on that carrier.

Another alternative is that the UE selects whether and which conditions to apply based on a pre-defined or a pre-configured rule. This may, for example, be specified in a specification. One example rule is that the UE would apply one or more of the conditions on LAA-carriers based on whether it can be determined that a carrier is an LAA-carrier. This determination may be based on whether it operates using certain type of frame structure. As an example, it can be frame structure 3 (3GPP TS 36.211) and/or the eNB has configured certain parameters for that carrier (e.g., laa-SCellConfiguration). Another example rule is that the UE would apply one or more of the conditions on carriers on certain frequency band(s), such as in the range of 5-6 GHz, LTE band number 46, etc.

Some embodiments may involve a method in a UE for partial uplink transmission timing adjustment that is based on downlink signal reception accuracy. In an example, the UE will determine the accuracy of the downlink timing and based on this, determine if and how much the UE shall update the uplink transmission timing. The accuracy of the downlink timing in turn depends on the number of downlink transmission received by the UE, such as the number of downlink subframes with DRS over certain time period. For instance, if the UE has received only a fewer downlink time resources (e.g., downlink subframes with DRS below threshold) recently (or to use the formulations from above; N is smaller than threshold for the past time T), then the accuracy of the downlink timing determined by the UE may be worse than an accuracy threshold, such as worse than $\pm 24$ Ts, where 1 Ts=32.55 ns. In this scenario, the UE may perform a partial uplink transmission timing adjustment, such as updating the uplink timing with a smaller amount than it would adjust the uplink timing, if the determined downlink timing accuracy is not worse than the accuracy threshold. The UE may apply a certain threshold for N and T for determining when the accuracy is considered high and when it is considered low. For example, if N is less than 2 downlink subframes and/or Tis above 80 ms, then the UE may assume that the accuracy of the downlink timing estimated by the UE is worse than the threshold (e.g., larger than the magnitude of $\pm 24$ Ts).

In yet another example, the UE may adapt the uplink timing adjustment value based on a parameter related to the estimated accuracy of the downlink timing. That is, the amount of uplink transmission timing adjustment may be scaled or adapted by the number of successfully received downlink transmissions over the past time period T. For example, if during the time period T the UE can receive at most $N_{max}$ number of downlink receptions, but the UE actually receive $N_{received}$ number of downlink receptions, then the UE may update the uplink transmission timing with a size S expressed in time, such as between $\pm 12$ Ts to $\pm 24$ Ts. In general, S can be expressed as a function of $S_{max}$, $N_{received}$ and $N_{max}$, such as $S=f(S_{max}, N_{received}, N_{max})$. More specifically, S can be expressed by the following relation:

$$S=S_{max}*(N_{received}/N_{max}).$$

The UE may also consider the quality of the channel when determining the amount of the timing adjustment. The UE may scale the adjustment step size with a value X, which is calculated as a function of the estimated quality of the channel, such as $S=S_{max}*f(\text{Channel quality})$. Note that the function may not be limited to only considering the quality of the channel.

Figure 6:
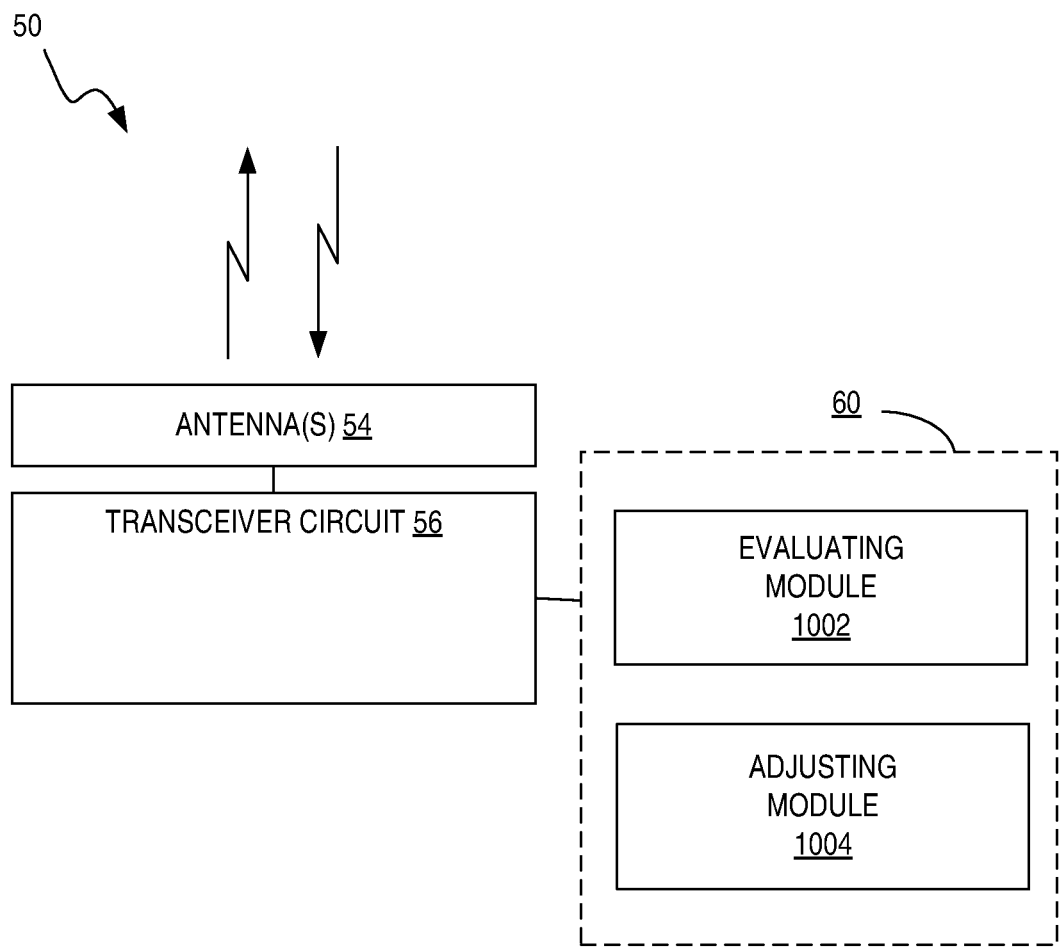
FIG. 6 is a block diagram illustrating a functional implementation of a wireless device configured to maintain timing associated with uplink transmissions, according to some embodiments.

FIG. 6 illustrates an example functional module or circuit architecture as may be implemented in the user equipment 50, e.g., based on the transmit timing maintenance circuitry 60. The illustrated embodiment at least functionally includes an evaluating module 1002 for evaluating, for each of a plurality of scheduled LBT transmission opportunities, a condition regarding a number of downlink receptions within an evaluation period preceding the scheduled uplink transmission opportunity. The implementation also includes an adjusting module 1004 for selectively adjusting or not adjusting the timing, for each scheduled uplink transmission opportunity, based on the evaluating.

Figure 7:
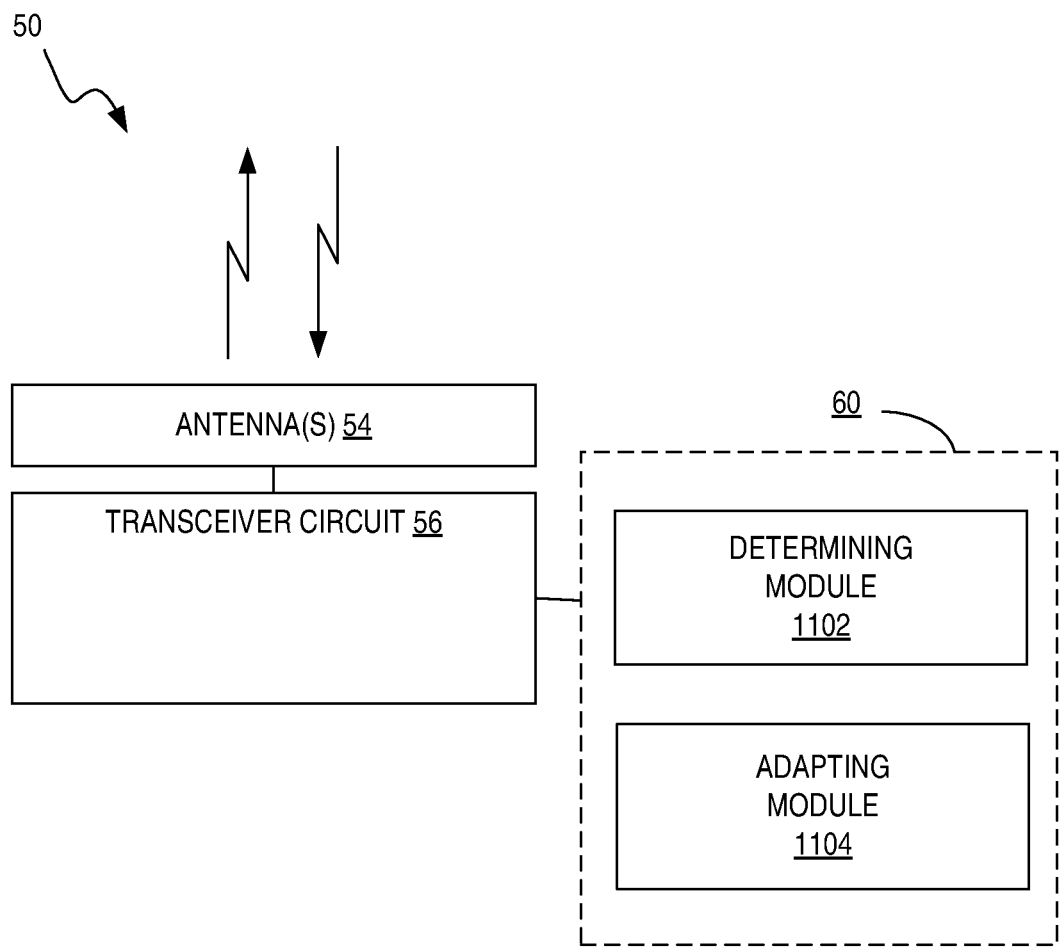
FIG. 7 is another block diagram illustrating a functional implementation of a wireless device configured to maintain timing associated with uplink transmissions, according to some embodiments.

FIG. 7 illustrates another example functional module or circuit architecture as may be implemented in the user equipment 50, e.g., based on the transmit timing maintenance circuitry 60. The illustrated embodiment at least functionally includes, for each of a plurality of scheduled LBT transmission opportunities at which the timing is adjusted, a determining module 1102 for determining an accuracy of an estimated downlink timing and an adapting module 1104 for scaling or adapting an adjustment to the timing based on the determined accuracy.

While it would be desirable to account for results from LBT assessment to determine whether to adjust timing associated with uplink transmission, in some UE architectures/implementations, the module performing the LBT may be located close to the antenna in the UE. This can mean that the LBT procedure is one of the last procedures performed by the UE before the transmission. Due to this module location, it may not be possible for other mechanisms in the UE, that are applied or performed prior to the LBT procedure, to take the outcome of the LBT evaluation into account. For example, the Medium Access Control (MAC) layer may be unable to take one action for the case when the channel is busy and another action when the channel is free. This is because some MAC operations may be performed prior to LBT being evaluated, as it may not be feasible to first evaluate LBT and then, based on the outcome, take different actions in MAC. The reason why this may not be feasible is that LBT operates on a very short time-frame—thus, the time from when the UE has sensed/"listened" to the channel until that the UE transmits may be very short and the UE may not be able to perform MAC processing in the short time between sensing and transmission.

In the case of uplink transmission timing handling, it may be that certain mechanisms or functions are performed by an entity higher up or earlier in the UE's radio structure. (Here, "entity" refers to a functional module, which may be implemented by a processor executing program instructions, or by a digital logic, or by some combination thereof.) This means that this entity may not know whether (due to LBT) the channel is considered free or busy when doing the uplink transmission timing adjustments.

For such UE architectures, in some embodiments, the uplink transmission timing handling entity assumes that a planned transmission will succeed (i.e., that the transmission will be performed) and will thus update the uplink transmission timing according to the defined rules (e.g. as described in connection with FIGS. 4 and 5). However, if it turns out that the channel was busy (and hence that the UE could not successfully perform the transmission), then the uplink transmission timing handling entity is made aware of this after LBT has been performed, in these embodiments. This notification may be implemented by an indication sent from the LBT-entity to the entity handling uplink transmission timing. In some cases, the indication is sent from the LBT-entity to the uplink transmission timing handling entity only in a case of a failed transmission, but not in a case of a successful transmission. Absence of the indication may indicate a successful transmission. Or vice-versa, an indication may only be sent in a case where the LBT entity successfully transmits, in some embodiments, in which case the absence of an indication implicitly means that the channel was busy.

The uplink transmission timing handling entity may, based on the indications from the LBT-entity, determine whether LBT was successful or not. Based on whether the UE performed the transmission, the uplink transmission handling entity reverts the uplink transmission timing to the timing that the UE should have applied in case no transmission took place.

In another example, instead of making an assumption about the successful transmission, the uplink transmission timing adjustment may be applied based on the UE LBT success history or the estimated likelihood the UE LBT success.

Figure 8:
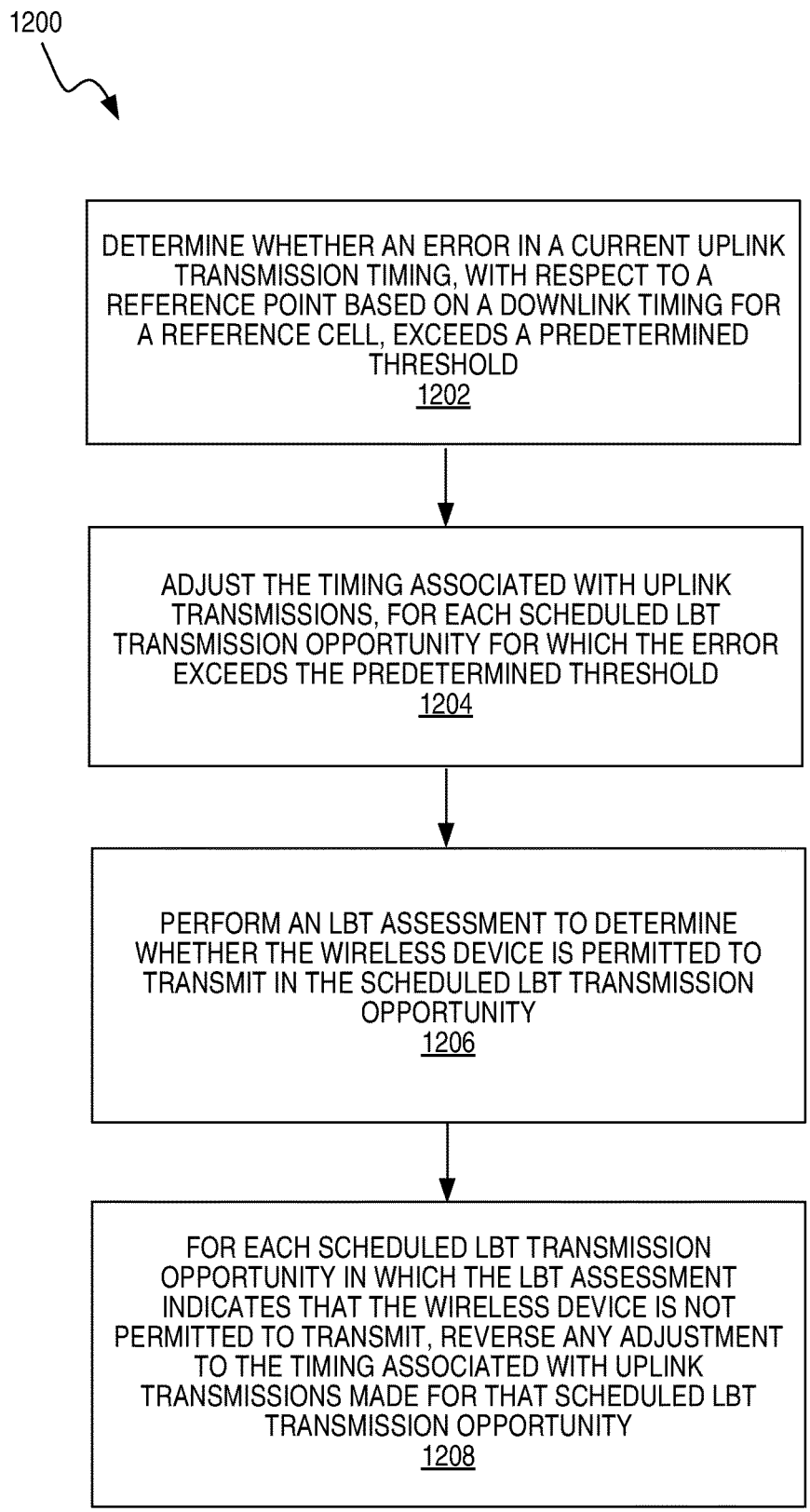
FIG. 8 illustrates another method of maintaining timing associated with uplink transmissions, according to some embodiments.

Accordingly, FIG. 8 illustrates an example method 1200 that may be implemented in a wireless device, such as by the processing circuit 52 in UE 50, for maintaining timing associated with uplink transmissions. The method 1200 includes: determining, for each of a plurality of scheduled LBT transmission opportunities, whether an error in a current uplink transmission timing, with respect to a reference point based on a downlink timing for a reference cell, exceeds a predetermined threshold (block 1202). The method further comprises adjusting the timing associated with uplink transmissions, for each scheduled LBT transmission opportunity for which the error exceeds the predetermined threshold (block 1204). The method 1200 also includes performing an LBT assessment to determine whether the wireless device is permitted to transmit in the scheduled LBT transmission opportunity (block 1206), for each of the plurality of scheduled LBT transmission opportunities, and for each scheduled LBT transmission opportunity in which the LBT assessment indicates that the wireless device is not permitted to transmit, reversing any adjustment to the timing associated with uplink transmissions made for that scheduled LBT transmission opportunity (block 1208).

Figure 9:
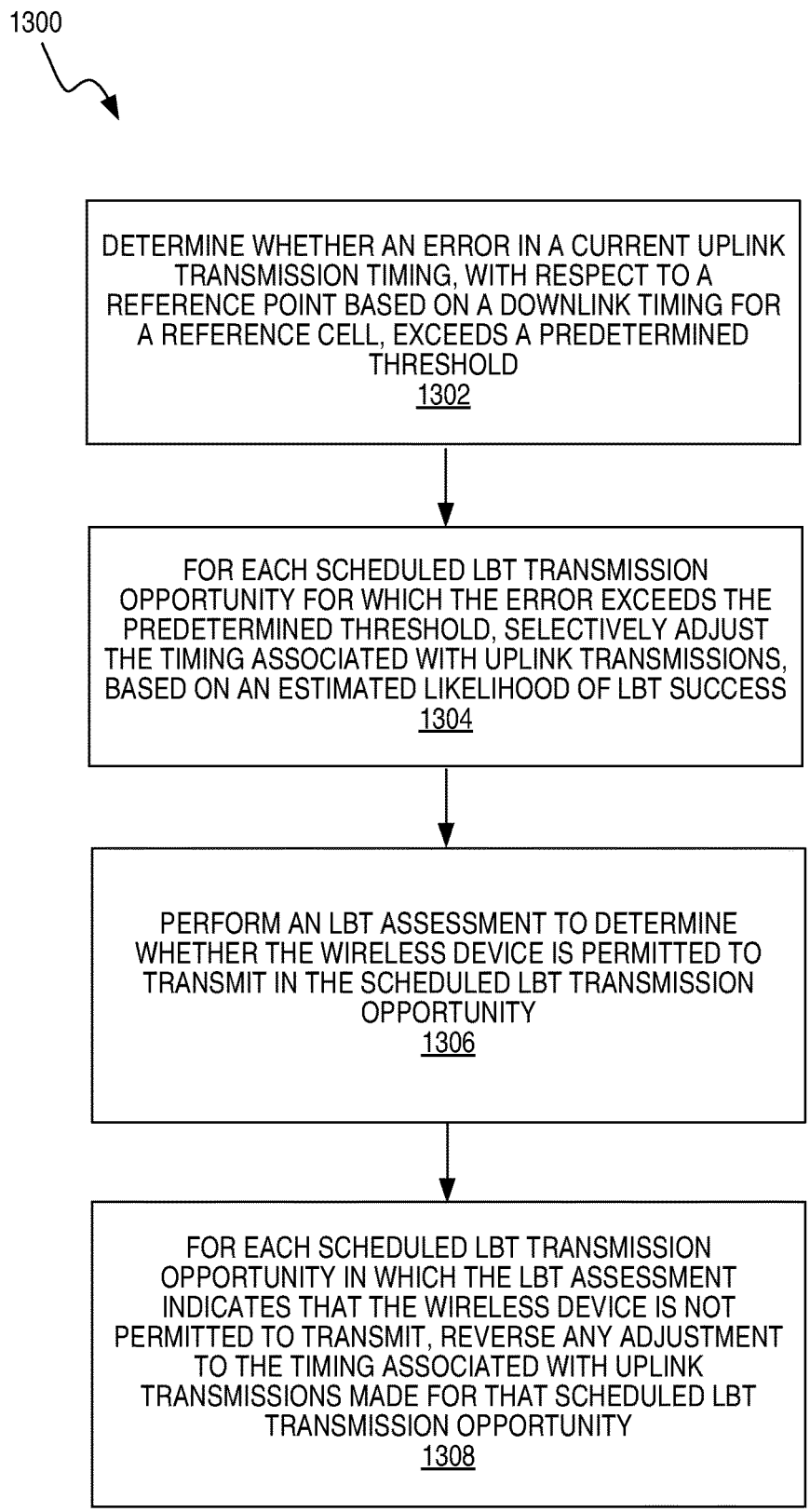
FIG. 9 illustrates another method of maintaining timing associated with uplink transmissions, according to some embodiments.

FIG. 9 illustrates another example method 1300 that may be implemented in a wireless device, such as by the processing circuit 52 in UE 50, for maintaining timing associated with uplink transmissions. The method 1300 includes: determining, for each of a plurality of scheduled LBT transmission opportunities, whether an error in a current uplink transmission timing, with respect to a reference point based on a downlink timing for a reference cell, exceeds a predetermined threshold (block 1302), The method further includes selectively adjusting the timing associated with uplink transmissions, for each scheduled LBT transmission opportunity for which the error exceeds the predetermined threshold, based on an estimated likelihood of LBT success (block 1304). The estimated likelihood of LBT success may be based on a history of LBT successes and failures. The method 1300 also includes performing an LBT assessment, for each of the plurality of scheduled LBT transmission opportunities, to determine whether the wireless device is permitted to transmit in the scheduled LBT transmission opportunity (block 1306), and for each scheduled LBT transmission opportunity in which the LBT assessment indicates that the wireless device is not permitted to transmit, reversing any adjustment to the timing associated with uplink transmissions made for that scheduled LBT transmission opportunity (block 1308).

Figure 10:
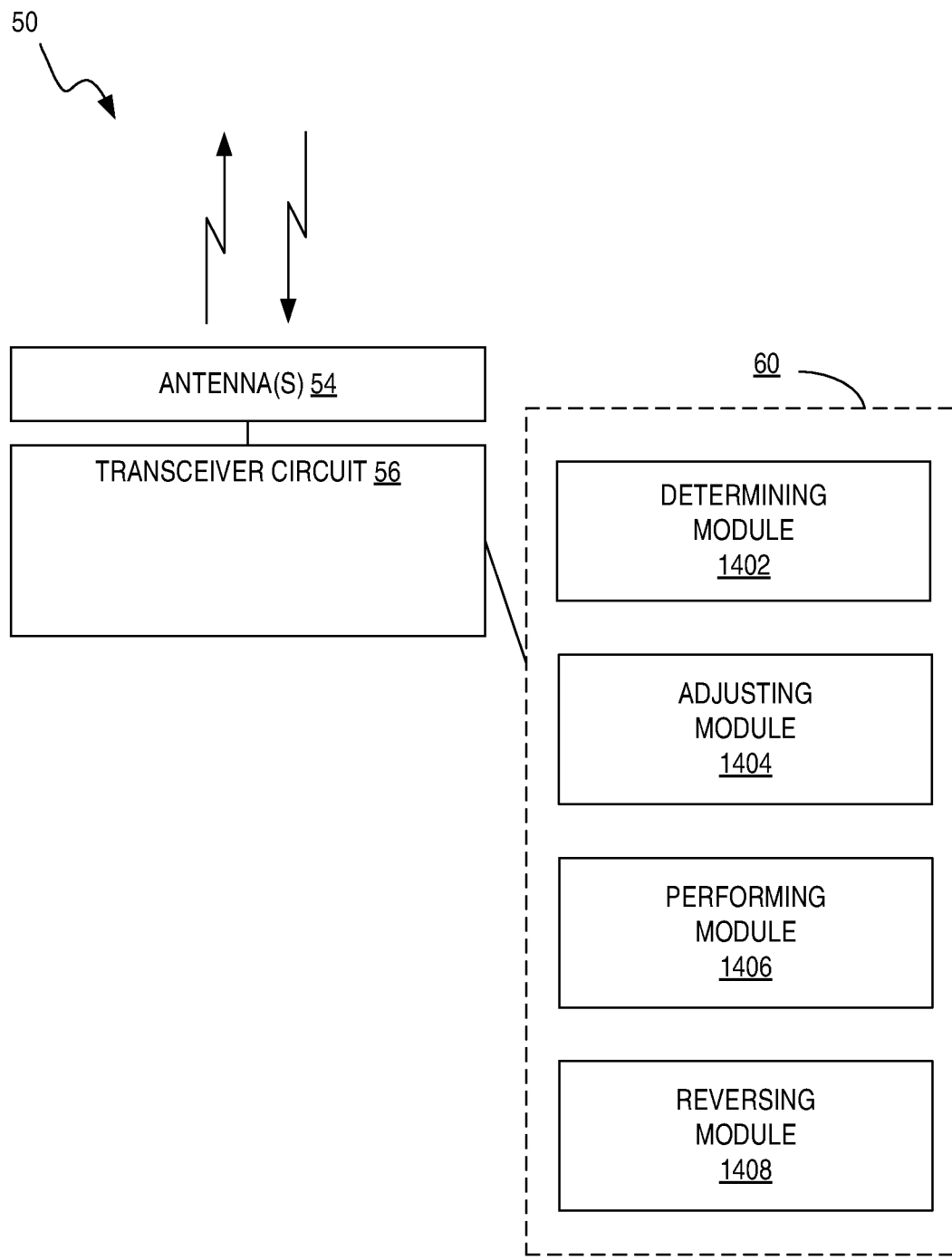
FIG. 10 is another block diagram illustrating a functional implementation of a wireless device configured to maintain timing associated with uplink transmissions, according to some embodiments.

FIG. 10 illustrates another example functional module or circuit architecture as may be implemented in the user equipment 50, e.g., based on the transmit timing maintenance circuitry 60. The illustrated embodiment at least functionally includes a determining module 1402 for determining, for each of a plurality of scheduled LBT transmission opportunities, whether an error in a current uplink transmission timing, with respect to a reference point based on a downlink timing for a reference cell, exceeds a predetermined threshold, and an adjusting module 1404 for adjusting the timing associated with uplink transmissions, for each scheduled LBT transmission opportunity for which the error exceeds the predetermined threshold. The functional implementation for each of a plurality of scheduled LBT transmission opportunities also includes a performing module 1406 for performing an LBT assessment, for each of the plurality of scheduled LBT transmission opportunities, to determine whether the wireless device is permitted to transmit in the scheduled LBT transmission opportunity, and a reversing module 1408 for, for each scheduled LBT transmission opportunity in which the LBT assessment indicates that the wireless device is not permitted to transmit, reversing any adjustment to the timing associated with uplink transmissions made for that scheduled LBT transmission opportunity (block 1208). In another example implementation, the adjusting module 1404 is for selectively adjusting the timing associated with uplink transmissions, for each scheduled LBT transmission opportunity for which the error exceeds the predetermined threshold, based on an estimated likelihood of LBT success.

Example embodiments may include:
1. A method, in a wireless device, for maintaining timing associated with uplink transmissions, the method comprising, for each of a plurality of scheduled listen-before-talk (LBT) transmission opportunities:
   determining whether an error in a current uplink transmission timing, with respect to a reference point based on a downlink timing for a reference cell, exceeds a predetermined threshold;
   adjusting the timing associated with uplink transmissions, for each scheduled LBT transmission opportunity for which the error exceeds the predetermined threshold;
   performing an LBT assessment to determine whether the wireless device is permitted to transmit in the scheduled LBT transmission opportunity; and for each scheduled LBT transmission opportunity in which the LBT assessment indicates that the wireless device is not permitted to transmit, reversing any adjustment to the timing associated with uplink transmissions made for that scheduled LBT transmission opportunity.

2. A method, in a wireless device, for maintaining timing associated with uplink transmissions, the method comprising, for each of a plurality of scheduled listen-before-talk (LBT) transmission opportunities:
determining whether an error in a current uplink transmission timing, with respect to a reference point based on a downlink timing for a reference cell, exceeds a predetermined threshold;
for each scheduled LBT transmission opportunity for which the error exceeds the predetermined threshold, selectively adjusting the timing associated with uplink transmissions, based on an estimated likelihood of LBT success;
performing an LBT assessment to determine whether the wireless device is permitted to transmit in the scheduled LBT transmission opportunity.

3. The method of embodiment 2, wherein the method further comprises for each scheduled LBT transmission opportunity in which the LBT assessment indicates that the wireless device is not permitted to transmit, reversing any adjustment to the timing associated with uplink transmissions made for that scheduled LBT transmission opportunity 4. The method of embodiment 2 or 3, wherein the estimated likelihood of LBT success is based on a history of LBT successes and failures.

5. A wireless device adapted to carry out a method according to any of embodiments 1 to 4.

6. A wireless device configured to maintain timing associated with uplink transmissions, comprising a processing circuit configured to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
adjust the timing associated with uplink transmissions, for each scheduled LBT transmission opportunity for which the error exceeds the predetermined threshold;
perform an LBT assessment to determine whether the wireless device is permitted to transmit in the scheduled LBT transmission opportunity; and
for each scheduled LBT transmission opportunity in which the LBT assessment indicates that the wireless device is not permitted to transmit, reverse any adjustment to the timing associated with uplink transmissions made for that scheduled LBT transmission opportunity.

7. A wireless device configured to maintain timing associated with uplink transmissions, comprising a processing circuit configured to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
for each scheduled LBT transmission opportunity for which the error exceeds the predetermined threshold, selectively adjust the timing associated with uplink transmissions, based on an estimated likelihood of LBT success;
perform an LBT assessment to determine whether the wireless device is permitted to transmit in the scheduled LBT transmission opportunity.

8. The wireless device of embodiment 7, wherein the processing circuit is further configured to, for each scheduled LBT transmission opportunity in which the LBT assessment indicates that the wireless device is not permitted to transmit, reverse any adjustment to the timing associated with uplink transmissions made for that scheduled LBT transmission opportunity.

9. The wireless device of embodiment 7 or 8, wherein the estimated likelihood of LBT success is based on a history of LBT successes and failures.

10. A non-transitory computer readable storage medium storing a computer program for maintaining timing associated with uplink transmissions comprising program instructions that, when executed on a wireless device configured to operate in a wireless communication network, cause the processing circuit to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
adjust the timing associated with uplink transmissions, for each scheduled LBT transmission opportunity for which the error exceeds the predetermined threshold;
perform an LBT assessment to determine whether the wireless device is permitted to transmit in the scheduled LBT transmission opportunity; and
for each scheduled LBT transmission opportunity in which the LBT assessment indicates that the wireless device is not permitted to transmit, reverse any adjustment to the timing associated with uplink transmissions made for that scheduled LBT transmission opportunity.

11. A non-transitory computer readable storage medium storing a computer program for maintaining timing associated with uplink transmissions comprising program instructions that, when executed on a wireless device configured to operate in a wireless communication network, cause the processing circuit to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
for each scheduled LBT transmission opportunity for which the error exceeds the predetermined threshold, selectively adjust the timing associated with uplink transmissions, based on an estimated likelihood of LBT success;
perform an LBT assessment to determine whether the wireless device is permitted to transmit in the scheduled LBT transmission opportunity.

12. A computer program, comprising instructions which, when executed on at least one processing circuit, cause the at least one processing circuit to carry out the method according to any one of embodiments 1 to 4.

13. A carrier containing the computer program of embodiment 12, wherein the carrier is one of an electronic signal, optical signal, radio signal, or computer readable storage medium.

14. A wireless device comprising, for each of a plurality of scheduled LBT transmission opportunities:

a determining module for determining whether an error in a current uplink transmission timing, with respect to a reference point based on a downlink timing for a reference cell, exceeds a predetermined threshold;
an adjusting module for adjusting the timing associated with uplink transmissions, for each scheduled LBT transmission opportunity for which the error exceeds the predetermined threshold;
a performing module for performing an LBT assessment to determine whether the wireless device is permitted to transmit in the scheduled LBT transmission opportunity; and
a reversing module for, for each scheduled LBT transmission opportunity in which the LBT assessment indicates that the wireless device is not permitted to transmit, reversing any adjustment to the timing associated with uplink transmissions made for that scheduled LBT transmission opportunity.

15. A wireless device comprising, for each of a plurality of scheduled LBT transmission opportunities:
a determining module for determining whether an error in a current uplink transmission timing, with respect to a reference point based on a downlink timing for a reference cell, exceeds a predetermined threshold;
an adjusting module for, for each scheduled LBT transmission opportunity for which the error exceeds the predetermined threshold, selectively adjusting the timing associated with uplink transmissions, based on an estimated likelihood of LBT success; and
a performing module for performing an LBT assessment to determine whether the wireless device is permitted to transmit in the scheduled LBT transmission opportunity.

16. The wireless device of embodiment 15 further comprising a reversing module for, for each scheduled LBT transmission opportunity in which the LBT assessment indicates that the wireless device is not permitted to transmit, reversing any adjustment to the timing associated with uplink transmissions made for that scheduled LBT transmission opportunity.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device, for maintaining timing associated with uplink transmissions, the method comprising, for each of a plurality of scheduled listen-before-talk (LBT) transmission opportunities:
determining whether an error in a current uplink transmission timing, with respect to a reference point based on a downlink timing for a reference cell, exceeds a predetermined threshold;
adjusting the timing associated with uplink transmissions, for each scheduled LBT transmission opportunity for which the error exceeds the predetermined threshold;
performing an LBT assessment to determine whether the wireless device is permitted to transmit in the scheduled LBT transmission opportunity; and
for each scheduled LBT transmission opportunity in which the LBT assessment indicates that the wireless device is not permitted to transmit, reversing any adjustment to the timing associated with uplink transmissions made for that scheduled LBT transmission opportunity.

2. A method, in a wireless device, for maintaining timing associated with uplink transmissions, the method comprising, for each of a plurality of scheduled listen-before-talk (LBT) transmission opportunities:
determining whether an error in a current uplink transmission timing, with respect to a reference point based on a downlink timing for a reference cell, exceeds a predetermined threshold;
for each scheduled LBT transmission opportunity for which the error exceeds the predetermined threshold, selectively adjusting the timing associated with uplink transmissions, based on an estimated likelihood of LBT success; and
performing an LBT assessment to determine whether the wireless device is permitted to transmit in the scheduled LBT transmission opportunity.

3. The method of claim 2, further comprising for each scheduled LBT transmission opportunity in which the LBT assessment indicates that the wireless device is not permitted to transmit, reversing any adjustment to the timing associated with uplink transmissions made for that scheduled LBT transmission opportunity.

4. The method of claim 2, wherein the estimated likelihood of LBT success is based on a history of LBT successes and failures.

5. A wireless device configured to maintain timing associated with uplink transmissions, the wireless device comprising a processing circuit configured to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
adjust the timing associated with uplink transmissions, for each scheduled LBT transmission opportunity for which the error exceeds the predetermined threshold;
perform an LBT assessment to determine whether the wireless device is permitted to transmit in the scheduled LBT transmission opportunity; and
for each scheduled LBT transmission opportunity in which the LBT assessment indicates that the wireless device is not permitted to transmit, reverse any adjustment to the timing associated with uplink transmissions made for that scheduled LBT transmission opportunity.

6. A wireless device configured to maintain timing associated with uplink transmissions, the wireless device comprising a processing circuit configured to, for each of a plurality of scheduled listen-before-talk (LBT) transmission opportunities:
determine whether an error in a current uplink transmission timing, with respect to a reference point based on a downlink timing for a reference cell, exceeds a predetermined threshold;
for each scheduled LBT transmission opportunity for which the error exceeds the predetermined threshold, selectively adjust the timing associated with uplink transmissions, based on an estimated likelihood of LBT success; and perform an LBT assessment to determine whether the wireless device is permitted to transmit in the scheduled LBT transmission opportunity.

7. The wireless device of claim 6, wherein the processing circuit is further configured to, for each scheduled LBT transmission opportunity in which the LBT assessment indicates that the wireless device is not permitted to transmit, reverse any adjustment to the timing associated with uplink transmissions made for that scheduled LBT transmission opportunity.

8. The wireless device of claim 6, wherein the estimated likelihood of LBT success is based on a history of LBT successes and failures.

9. A non-transitory computer-readable medium comprising, stored thereupon, a computer program comprising instructions that, when executed on at least one processing circuit of a wireless device, cause the at least one processing circuit to, for each of a plurality of scheduled listen-before-talk (LBT) transmission opportunities:
- determine whether an error in a current uplink transmission timing, with respect to a reference point based on a downlink timing for a reference cell, exceeds a predetermined threshold;
- adjust the timing associated with uplink transmissions, for each scheduled LBT transmission opportunity for which the error exceeds the predetermined threshold;
- perform an LBT assessment to determine whether the wireless device is permitted to transmit in the scheduled LBT transmission opportunity; and
- for each scheduled LBT transmission opportunity in which the LBT assessment indicates that the wireless device is not permitted to transmit, reverse any adjustment to the timing associated with uplink transmissions made for that scheduled LBT transmission opportunity.

* * * * *